(12) United States Patent
Buss

(10) Patent No.: US 9,955,052 B2
(45) Date of Patent: Apr. 24, 2018

(54) DEVICE HAVING A CAMERA UNIT AND A COVER ELEMENT

(71) Applicant: Wolfgang Buss, Solingen (DE)

(72) Inventor: Wolfgang Buss, Solingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 208 days.

(21) Appl. No.: 15/098,967

(22) Filed: Apr. 14, 2016

(65) Prior Publication Data

US 2016/0316114 A1    Oct. 27, 2016

(30) Foreign Application Priority Data

Apr. 24, 2015   (DE) .................. 10 2015 106 394

(51) Int. Cl.
| | |
|---|---|
| *H04N 5/225* | (2006.01) |
| *B60R 11/04* | (2006.01) |
| *B60R 11/00* | (2006.01) |

(52) U.S. Cl.
CPC ............ *H04N 5/2252* (2013.01); *B60R 11/04* (2013.01); *H04N 5/2254* (2013.01); *B60R 2011/0082* (2013.01)

(58) Field of Classification Search
None
See application file for complete search history.

(56) References Cited

U.S. PATENT DOCUMENTS

| | | |
|---|---|---|
| 2013/0294758 A1 | 11/2013 | Barthel |
| 2015/0274090 A1 | 10/2015 | Buschmann et al. |

FOREIGN PATENT DOCUMENTS

| | | |
|---|---|---|
| DE | 10 2007 052 402 A1 | 5/2009 |
| DE | 10 2010 060 573 A1 | 5/2012 |
| DE | 10 2012 025 626 A1 | 4/2014 |
| DE | 10 2013 111 224 A1 | 4/2014 |

*Primary Examiner* — Roberto Velez
*Assistant Examiner* — Yih-Sien Kao
(74) *Attorney, Agent, or Firm* — Fay Sharpe LLP

(57) ABSTRACT

A device having a camera unit for recording images of the exterior of a motor vehicle, includes a support assembly accommodating the camera unit which is movable between a standby position and an active position, a cover element and a movement mechanism. The movement mechanism includes a first pivot element, which is pivotably supported on the support assembly such that it can pivot about a first rotational axle, and which is connected to a first articulation axle of the camera unit in an articulated manner, a second pivot element, which is pivotably supported on the support assembly, such that it can pivot about a second rotational axle, and which is connected to a second articulation axle of the camera unit, and a third pivot element, which is pivotably supported on the support assembly such that it can pivot about the first rotational axle, and which is connected to the cover element.

13 Claims, 2 Drawing Sheets

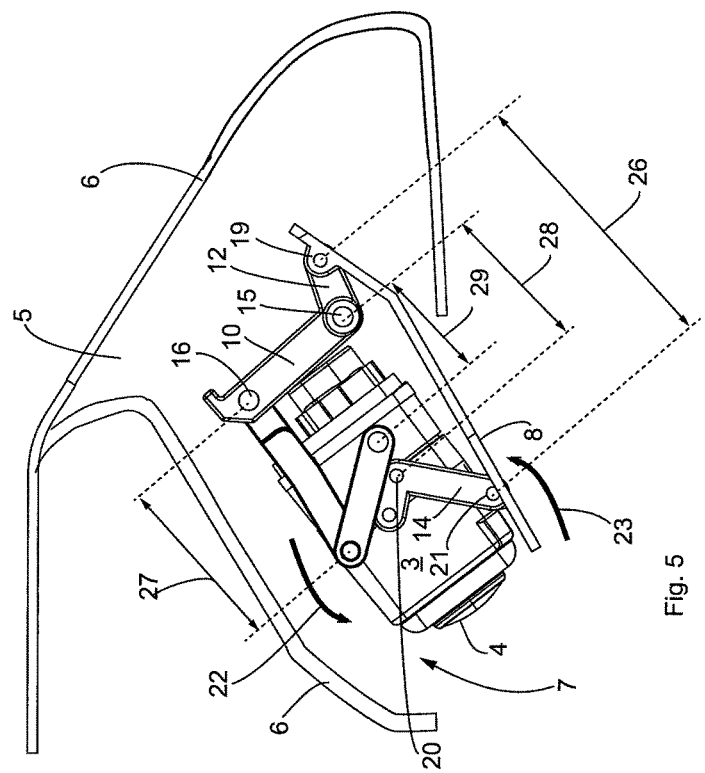
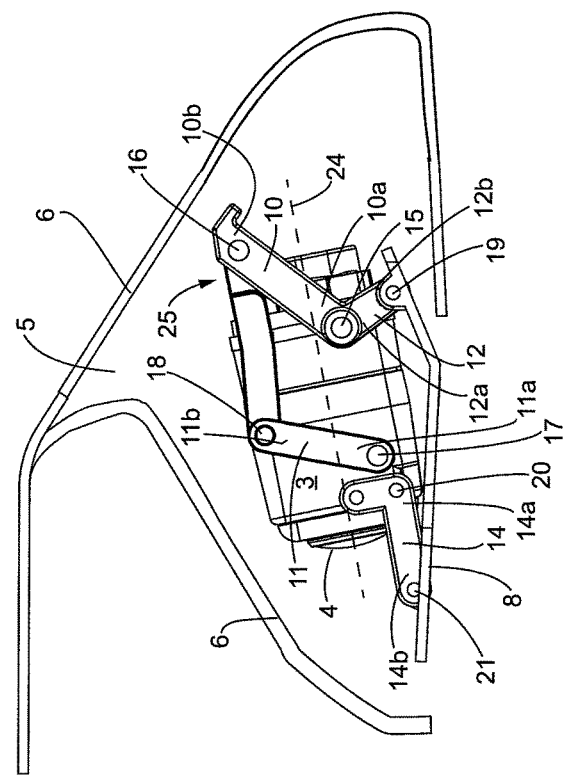

DEVICE HAVING A CAMERA UNIT AND A COVER ELEMENT

BACKGROUND

The invention relates to a device having a camera unit with a lens for recording images of the exterior of a motor vehicle, a support assembly having a through hole, and in which the camera unit is received such that it can move between a standby position, retracted into the support assembly, and an active position, in which the camera unit protrudes outward, at least in part, through the through hole of the support assembly, a cover element, which is designed such that it can move between a closed setting, in which it closes the through hole of the support assembly, and an open setting, and a movement mechanism for moving the camera and the cover element.

Devices with a camera unit designed for recording images of the exterior of a motor vehicle are already known from the prior art. Devices of this type comprise a camera unit, which is received in a housing for the camera unit such that it can move between a standby position and an active position. By way of example, camera units of this type may be used, for example, in the field of parking assistance for motor vehicles. If, for example, the reverse gear of the motor vehicle is shifted to, the camera unit moves from the standby position into the active position, wherein the camera unit is driven at least partially out of the housing. As a result, images of the area behind the motor vehicle are recorded by the camera unit, and displayed on a screen for the driver of the motor vehicle. If driving in reverse is completed, and the driver shifts out of the reverse gear, the camera unit can again be pivoted back from the active position into the standby position.

In order to protect the camera unit from contaminants, at least in the standby position, a cover element is provided, by means of which the hole, through which the camera unit travels out of the housing for the camera unit, can be closed when the camera unit is in the standby position. As a result, in the transition from the standby position to the active position of the camera unit, the cover element must be moved between a closed setting and an open setting at the same time.

A device of the type referred to in the introduction is known, for example, from DE 10 2012 025 626 A1. With this known device for receiving a camera unit, a carriage is moveably accommodated in a housing, onto which carriage the camera can be attached. The carriage is driven by a gear drive, which has swinging elements that are connected in an articulated manner to the carriage. Each swinging element can be pivoted about a stationary axle on the housing. The disadvantage with this prior art is that the cover element is pivotably supported on the outside of the housing, and when it pivots upward, a corresponding spatial requirement must be provided for on the outside of the housing, having a negative impact on the compactness of the device and the camera unit.

Furthermore, a device with a camera unit is known from DE 10 2007 052 402, designed for recording images of the exterior of a motor vehicle. The movement of the camera unit disclosed therein, and the resulting movement of the disclosed cover element in relation to the camera unit comprises numerous movement steps, such that a complex kinematic activation of the cover element is necessary. In particular, the device disclosed therein requires significant installation space in order to mover the camera unit and the cover element.

The object of the invention is to create a solution, by means of which a device having a camera unit and a cover element are provided in a structurally simple and cost-effective manner, requiring a small installation space, and which simultaneously is distinguished by a movement path that is kept small, which can keep the time interval for deploying the camera unit short.

BRIEF SUMMARY

With a device of the type referred to in the introduction, the object is achieved in accordance with the invention in that the movement mechanism comprises a first pivot element, which is pivotably supported on the support assembly at its first longitudinal end such that it can pivot about a first rotational axle, and is connected in an articulated manner at its second longitudinal end to a first articulation axle of the camera unit, a second pivot element, which is pivotably supported on the support assembly at its first longitudinal end such that it can pivot about a second rotational axle, and is connected in an articulated manner at its second longitudinal end to a second articulation axle of the camera unit, and a third pivot element, which is pivotably supported on the support assembly at its first longitudinal end such that it can pivot about the first rotational axle, and is connected at its second longitudinal end to the cover element.

Advantageous and useful designs and further developments of the invention can be derived from the dependent Claims.

A device having a camera unit for recording images of the exterior of a motor vehicle is provided by the invention, which is distinguished by a functional structure and a cost-effective construction. In accordance with the invention, a mechanical system having a movement mechanism is provided, with which the first pivot element and the second pivot element are supported on a respective stationary rotational axle. This double support of the camera unit via the assigned pivot elements causes the movement of the camera unit to be a pivotal movement with a tight travel curve, or movement curve in a small space. As a result, the camera unit is guided about the rotational axles by the two pivot elements, such that the space for receiving the camera unit is reduced to a minimum, and the device thus requires a simple construction having little structural space. Due to the tight travel curve, the time interval required for deploying the camera unit can be reduced to a minimum by means of the invention. Furthermore, the cover element can be rigidly disposed on the second longitudinal end of the third pivot element. Because both the first pivot element and the third pivot element are pivotably supported about the first rotational axle on the support assembly, a coupling of the movements of the first and third pivot elements can be provided, by means of which a pivotal movement about the first rotational axle then simultaneously causes a movement of the cover element from the closed position into the open position, and a movement of the camera unit from the standby position into the active position, by means of which, as a result, the camera is also ready for use within the shortest time period.

It is provided in the design of the invention that the movement of the camera unit from the standby position into the active position is opposite to the movement of the cover element from the closed setting into the open setting. In this manner, a minimum of time is used to move the camera unit into the active position, because, when the camera unit is pivoted into its active position, the cover element is pivoted at the same time, such that it opens the through hole in the support assembly.

It is of particular advantage, in the design of the invention, when the movement of the camera unit from the standby position into the active position occurs at the same time as the movement of the cover element from the closed setting into the open setting, and with these movements of the camera unit and the cover element, the respective pivotal movements of the first pivot element and the third pivot element have the same direction of rotation. This is because, with the same direction of rotation, it is possible to use a single drive motor, among other things, which ensures that the camera unit and the cover element are moved at the same time.

In order for the cover element to have a short movement path when it moves from the closed setting into the open setting and vice versa, by means of which the structural space can be made more compact and have smaller dimensions, it is provided in further designs of the invention that the second longitudinal end of the third pivot element is connected in an articulated manner to a first articulation axle of the cover element, and that the movement mechanism has a fourth pivot element, which is pivotably supported about a third rotational axle on the support assembly, and which is connected in an articulated manner at its second longitudinal end to a second articulation axle of the camera unit.

In a further preferred design of the device, the invention provides that the spacing between the first and second articulated axles of the cover element is greater than the spacing between the first and second articulated axles of the camera unit and/or the spacing between the first and third rotational axles of the support assembly. In this manner, the camera unit can be pivoted on a substantially smaller movement path than the cover element, as is also desired. This is because the cover element must first only be moved such that it opens the through hole, while the camera unit, in contrast, must be pivoted in a targeted manner, in order for it to be oriented toward the desired exterior area that it is to record.

For a particularly compact travel path, or movement path, respectively, it has been shown that it is advantageous when the rotational axles of the support assembly are disposed such that they lie behind one another from the lens of the camera unit to the longitudinal end of the camera unit facing away from the lens, with respect to the camera unit.

It is particularly practical thereby, in the design of the device according to the invention, when the camera unit is disposed in the standby position, the third rotational axle is disposed in the vicinity of the lens of the camera unit, and the first rotational axle is disposed in the vicinity of the longitudinal end of the camera unit facing away from the lens, wherein the second rotational axle is disposed between the first and third rotational axles.

Furthermore, it is advantageous for a compact design of the device, when the first and second pivot elements pivot the camera unit about the first and second pivotal axles of the support assembly during its movement from the standby position into the active position, while the third and fourth pivot elements pivot the cover element about the second and third rotational axles of the support assembly during its movement from the closed setting into the open setting.

Likewise practical, for a device having a compact construction, as well as for a camera unit, which must be able to be driven and moved in a tight structural space, it is the case that in the design of the invention, the spacing between the first and second articulated axles of the camera unit is greater than the spacing between the first and second rotational axles of the support assembly.

The invention provides in a further design that the first articulation axle of the camera unit is disposed thereon, on the longitudinal end of the camera unit facing away from the lens, and that the second articulation axle of the camera unit is disposed thereon, between the lens and the first articulation axle of the camera unit. Preferably, the second articulation axle is disposed in approximately the middle between the lens of the camera unit and the longitudinal end of the camera unit facing away from the lens, such that the camera unit can be rotated, or pivoted, respectively, at its rear section, very effectively via the two articulated axles, in a tight space, into the active position.

Likewise, with regard to a device having a compact structure, and a camera unit that can be pivoted in a tight space, it is advantageous when the first and second rotational axles of the support assembly are disposed lying closer to the through hole than the first and second articulated axles of the camera unit.

It is particularly efficient in terms of the design of the invention when the first rotational axle and/or the third rotational axle are/is designed to be connected to a drive. One design, in which only the third rotational axle is connected to a drive, has the advantage that, when the cover element is iced over, i.e. when the cover element is frozen to the through hole, a drive can act on the rotational axle with enough power, but this action will not damage the camera unit, which could be the case when the first rotational axle is driven, on which axle the camera is supported directly.

Lastly, the invention provides in a further design that the first pivot element and the third pivot element form a collective monolithic component, and the first longitudinal end of the first pivot element is connected to the first longitudinal end of the third pivot element, wherein the first pivot element is designed such that it is angled in relation to the third pivot element. In this manner, the number of rotational axles, and even the individual components, can be reduced.

It should be noted that, as set forth in the invention, a support assembly is understood to be both a separate housing, in which the assembly according to the invention is accommodated, having the camera unit, the cover element and the movement mechanism, and which can be installed in the body of the vehicle, as well as a recess in the body of the vehicle, in which the assembly according to the invention can be inserted and installed, having the camera unit, cover element and movement mechanism. The objective of the support assembly comprises the function of accommodating the assembly, having the camera unit, cover element and movement mechanism.

Likewise, as set forth in the invention, a rotational axle and an articulation axle are understood to be axles about which something that is supported thereon can rotate. This need not be an axle in the manner of a rod-shaped element or a driven rod. The rotational axles and articulation axles of the present invention can even comprise rotational and articulation points, on which an element is rotatably supported or attached at a point. Furthermore, the pivot elements of the present invention can be arms, which are attached on only one side of the camera unit at a point, and extend therefrom. On the other hand, the present invention is not to be limited to this understanding of the terms, because with rotational and articulated axles designed with the shape of a rod or the shape of an arm, the pivot elements can be two-armed, or double-armed elements, which are disposed on both sides of the camera unit and on the ends of the rod-shaped rotational and articulated axles, and run parallel to one another. As set forth in the invention, a pivot element is thus to be understood to be both a single-armed as well as a two-armed design, as described above.

It is to be understood that the features specified above, and to be explained below, may be used not only in the respective defined combinations, but also in other combinations, or in and of themselves, without abandoning the scope of the present invention. The scope of the invention is defined only by the Claims.

BRIEF DESCRIPTION OF THE DRAWINGS

Further details, features and advantages of the subject matter of the invention can be derived from the following description in conjunction with the drawings, in which a preferred embodiment of the invention is depicted by way of example. Therein:

FIG. 4 shows the device according to the invention in a side view, with the camera unit disposed in its standby position, and FIG. 5 shows the device according to the invention in another side view, with the camera unit disposed in its active position.

DETAILED DESCRIPTION

Figure 1:
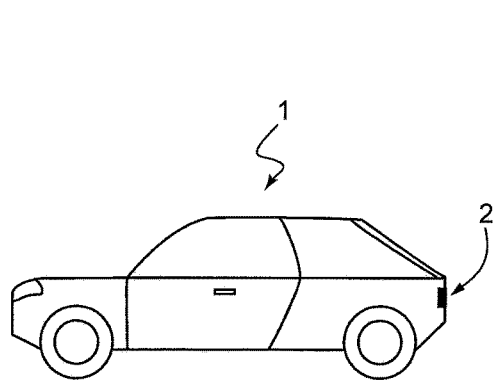
FIG. 1 shows a schematically depicted motor vehicle having an device according to the invention indicated by way of example.
Figure 2:
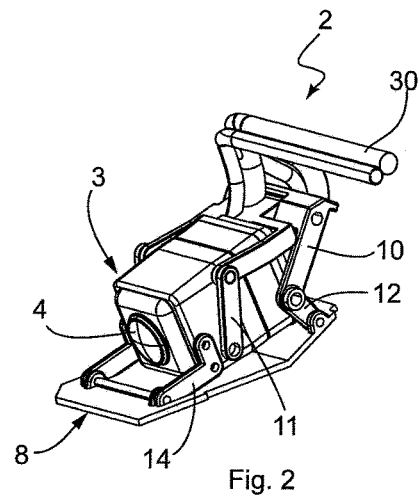
FIG. 2 shows a perspective depiction of a camera unit, a cover element and a movement mechanism of the device or assembly according to the invention.

FIG. 1 shows a side view of a motor vehicle 1, which has an embodiment of a device 2 according to the present invention on its rear end or bumper. As FIG. 2 shows, the device 2 comprises a camera unit 3, which serves to record images of the exterior of the motor vehicle 1, and for this purpose is equipped with a lens 4 and a wiring. The camera unit 3 is accommodated in a recess 5 of a support assembly with respect to FIGS. 4 and 5. The camera unit 3 is moveably accommodated in the support assembly 6, such that it can move, by means of a mechanism, which shall be explained below, between a standby position (see FIG. 4) and an active position (see FIG. 5). In the standby position, the camera unit 3 is retracted into the support assembly 6, and disposed such that it is protected in the recess 5 of the support assembly 6, while in the active position, in contrast, the camera unit 3 protrudes downward, at least in part, through a through hole 6 of the support assembly 7. In the standby position of the camera unit 3, a cover element 8 shown in FIGS. 2 to 5 closes the through hole 7 of the support assembly 6, which can be a part of the body of the motor vehicle 1, or a separate housing, which can be installed in the body of the motor vehicle 1. The cover element 8 itself is designed such that it can be moved between a closed setting (see FIG. 4) in which it closes the through hole 7 of the support assembly 6, and an open setting (see FIG. 5) in which the cover element 8 exposes the through hole 7 of the camera unit 3. Using the cover element 8, the camera unit 3 is protected from environmental effects such as rain, dust, sunlight, dirt and potential theft as well. The movement of the cover element 8 occurs thereby with the same mechanism that also moves the camera unit 3.

In order to move the camera unit 3 and the cover element 8 accordingly, the mechanism referred to above is depicted in FIGS. 2 to 5, which shall be referred to below as a movement mechanism 9. The movement mechanism 9 for the simultaneous movement of the camera unit 3 and the cover element 8 has a first pivot element 10, a second pivot element 11, a third pivot element 12, and a fourth pivot element 14. Because the camera unit 3 is moved by these pivot elements, the camera unit 3 also basically belongs to the movement mechanism 9, as is indicated in FIG. 23 by the braces. The pivot elements 10, 11, 12, 14 are designed in the shapes of levers and rods. In the depicted exemplary embodiment, the first pivot element 10 and the third pivot element 12 form a collective monolithic component, wherein the first longitudinal end 10a of the first pivot element 10 is rigidly, or non-rotatably, connected to the first longitudinal end 12a of the third pivot element 12. The first pivot element 10 is formed thereby such that it is angled in relation to the third pivot element 12. The rod-shaped pivot elements 10, 11, 12, 14 are furthermore designed as double-armed pivot arms, wherein the two arms that are assigned to a single pivot element are disposed at the sides of the camera unit 3, and extend therefrom.

Figure 3:
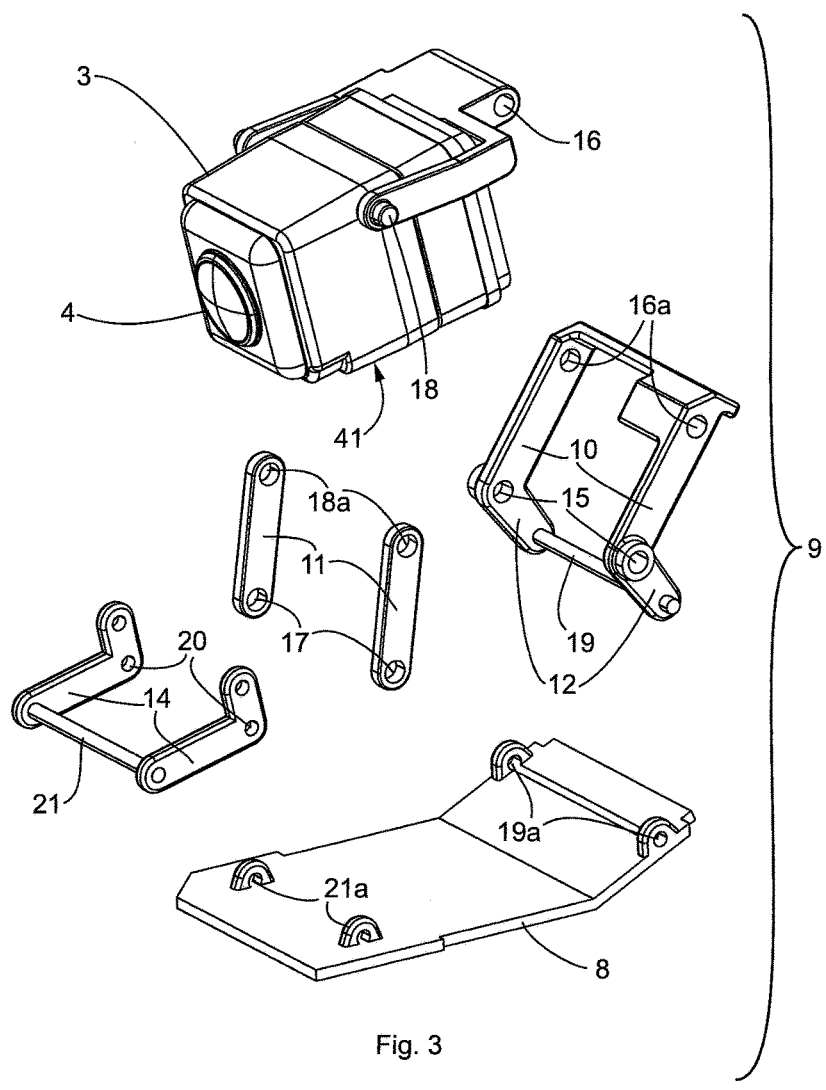
FIG. 3 shows a perspective exploded view of the camera unit, the cover element and the movement mechanism.

As is visible, for example, in FIGS. 3, 4 and 5, the first pivot element 10 is pivotably supported at its first longitudinal end such that it can rotate about a first pivotal axle 15 on the support assembly 6, and it is connected in an articulated manner to a first articulation axle 16 of the camera unit 3 at its second longitudinal end 10b, wherein the pivot element 10 is supported via the receiving hole 16a on the first articulation axle 16 (see FIG. 3). Furthermore, the second pivot element 11 is pivotably supported at its first longitudinal end 11a about a second rotational axle 17 on the support assembly 6, and is connected in an articulated manner at its second longitudinal end 11b to a second articulation axle 18 of the camera unit 3, wherein here as well, the pivot element 11 has corresponding receiving holes 18a, via which the pivot element 11 is supported on the second articulation axle 18 (see FIG. 3). Furthermore, the third pivot element 12 is pivotably supported at its first longitudinal end 12 about the first rotational axle 14 of the support assembly 6, and is connected to the cover element 8 at its second longitudinal end 12b. In particular, the second longitudinal end 12b of the third pivot element 12 is connected in an articulated manner to a first articulation axle 19 of the cover element 9. The cover element 9 has receiving holes 19a, via which it is supported on the first articulation axle 19, or, respectively, by means of which, the cover element 9 can be pivoted in relation to the camera unit 3. Lastly, the fourth pivot element 15 is pivotably supported at its first longitudinal end 14a on the support assembly, such that it can pivot about a third rotational axle 20, and is connected in an articulated manner at its second longitudinal end 14b to a second articulation axle 21 of the camera unit 6. The cover element 9 has further receiving holes 21a for the second articulation axle 21, by means of which the cover element 9 can be pivoted, or rotated, in relation to the third pivot element 12, as well as the camera unit 3.

As can be seen, for example, in FIG. 3, the pivot elements 10, 11, 12, and 14—as noted above—are designed having two arms. The pair of arms of a respective pivot element 10, 11 extends thereby to the sides of the camera unit 3. On one hand, one pair of arms of a respective pivot element 10, 11 is directly attached to the camera unit 3 or to the cover element 8 via the corresponding axle, which can also be referred to as an articulation point (see, e.g., the first articulation axle 16 of the camera unit 3). On the other hand, a pair of arms of a corresponding pivot element 12, 14 are connected to one another via corresponding axles running in a transverse direction (see, e.g., the first articulation axle 19 of the cover element 8). In contrast, the rotational axles 15, 17, 20 formed on the support assembly 6 are conical, and formed in pairs on the walls of the support assembly, and are in a functional connection with corresponding receivers on the pivot elements 10 and 12, 11, 14, formed in pairs, such that the pivot elements 10 and 12, 11, 14 can rotate, or pivot, respectively, about the assigned rotational axles.

In order to move the camera unit 3 from the standby position into the active position, either the first rotational axle 15 is non-rotatably connected to the first and third pivot elements 10, 13, or the third rotational axle 20 is non-rotatably connected to the fourth pivot element 14, and is furthermore designed such that it is connected to a drive, such that a rotation of the first or third rotational axles 15, or 20, respectively, connected to a drive, leads to a pivoting of the first and third pivot elements 10, 12, or the fourth pivot element 14. The drive unit can be a known electric motor, which, however, shall not be explained in detail here. Alternatively, the camera unit 3 could also be connected to a drive, which ensures that the camera unit 3 is moved between the standby position and the active position.

When the first rotational axle 15 is connected to a drive, then the camera unit 3 is pivoted via the first pivot element 10, and the cover element 8 is pivoted via the third pivot element 12, while, in contrast, when the third rotational axle 20 is connected to a drive, only the cover element 8 is pivoted directly, and the pivoting of the cover element 8 via the third pivot element 12 pivots the camera unit 3 with it. The movement of the camera unit 3 from the standby position into the active position (see arrow 22 in FIG. 5) is in the opposite direction of the movement of the cover element 8 from the closed setting to the open setting (see arrow 23 in FIG. 5). The cover element 8 is moved close to the camera unit 3 in a direction facing away from the lens 4 when it is moved from the closed setting to the open setting, wherein the movement of the cover element 8 runs along the undersurface 31 of the camera unit 3. As can be derived, in particular, from FIG. 5, the cover element 8 dips, at least in part, into the recess 5 of the support assembly 6 during its movement from the closed setting to its open setting. In other words, the cover element 8 is disposed, at least in part, such that it dips into the recess 5 of the support assembly 6 when it is in its open setting. However, the cover element 8, when in the open setting, is not entirely moved out of the through hole 7, but only so far that at least the lens 4 of the camera unit 3 can be extended from the exposed region of the through hole 8 in order to record the exterior of the motor vehicle 1.

In order that a movement 22 of the camera unit 3 and a movement 23 of the cover element 8 is possible in the tightest of installation spaces, it is important that the various rotational axles 15, 17, 20, which are formed on the support assembly 6 and as are result, are disposed in a stationary manner, are disposed in a specific sequence along a longitudinal axis 24 of the camera unit 3 (see FIG. 4). The rotational axles 15, 17, 20 of the support assembly 6 are disposed behind one another with respect to the camera unit 6, or the longitudinal axes 24 thereof, from the lens 4 of the camera unit 3 to the longitudinal end 25 (see FIG. 4) of the camera unit 3 facing away from the lens 4. In particular— when the camera unit 3 is disposed in the standby position— the third rotational axle 20 is disposed in the vicinity of the lens 4 of the camera unit 3, and the first rotational axle 15 is disposed in the vicinity of the longitudinal end 25 of the camera unit 3 facing away from the lens 4. The second rotational axle 17 is disposed thereby between the first and third rotational axles 15 and 20.

Furthermore, it is the case that the first articulation axle 16 of the camera unit 3 on the longitudinal end 25 of the camera unit 3 facing away from the lens is disposed thereon. In contrast, the second articulation axle 18 of the camera unit 3 is disposed thereon between the lens 4 and the first articulation axle 16 of the camera unit 3. The first and second articulation axles 16, 18 of the camera unit 3 are disposed above the rotational axles 15, 17, 20, regardless of whether the camera unit 3 is disposed in its standby position or its active position. As a result, the first and second rotational axles 15, 17 of the support assembly 6 are disposed closer to the through hole 7 than the first and second articulation axles 16, 18 of the camera unit 3.

In order to keep the time period, until the camera unit 3 is moved from the standby position into the active position, short, the invention provides that the movement of the camera unit 3 from the standby position into the active position occurs at the same time as the movement of the cover element 8 from the closed setting into the open setting. While the cover element 8 thus moves from the closed setting into the open setting, the camera unit 3 moves at the same time from the standby position into the active position. During the movements of the camera unit 3 and the cover element 8, the respective pivot movements 22, 23 of the first and third pivot elements 10, 12 have the same direction of rotation, wherein the second and fourth pivot elements 11, 14 also have this direction of rotation, which is directed counter-clockwise when the camera unit 3 is moved into the active position, or the cover element 8 is moved into the open setting, respectively.

In order to also reduce the space requirement for moving the camera unit 3 and the cover element 8 to a minimum, in addition to the movement requiring little time, it is important that the spacing 26 between the first and second rotational axles 19, 21 of the cover element 8 is greater than the spacing 27 between the first and second articulation axles 16, 18 of the camera unit 3 (see FIG. 5). It is likewise important thereby, that the spacing 26 between the first and second rotational axles 19, 21 of the cover element 8 is greater than the spacing 28 between the first and third rotational axles 15, 20 of the support assembly 6, as can be seen in FIG. 5. As a result of this arrangement, a movement having a minimal space requirement can then be implemented, when the first and second pivot elements 10, 12 of the camera unit 3 pivot about the first and second rotational axles 15, 17 of the support assembly 6 when it moves from the standby position into the active position, while, at the same time, the third and fourth pivot elements 12, 14 of the cover element 8 pivot about the second and third rotational axles 17, 20 of the support assembly 6, when it moves from the closed setting into the open setting, as is shown by a comparison of FIGS. 4 and 5. For a movement of the camera unit 3 and the cover element 8 in a tight space, it is also beneficial when the spacing 27 between the first and second articulation axles 16, 18 of the camera unit 3 is greater than the spacing 29 between the first and second rotational axles 15, 17 of the support assembly 6 (see FIG. 5).

For the invention shown in the exemplary embodiment, it is characteristic that the four articulation axles 16, 18, 19, 21 change their relative positions to one another during the movement of the camera unit 3 and the cover element 8. Thus, when the cover element 8 is in the closed setting, the first articulation axle 19 of the cover element 8 is disposed between the lens 4 and the first articulation axle 16 of the camera unit 3, while, in contrast, when the cover element is in the open setting, the first articulation axle 16 of the camera unit 3 is disposed between the lens 4 and the first articulation axle 19 of the cover element 8.

In summary, the device 2 according to the invention, which more precisely stated is also an assembly according to the invention, comprises the camera unit 3, having the lens 4 for recording images of the exterior of the motor vehicle 1, the support assembly 6, which has the through hole 7, and inside which, the camera unit 3 is moveably accommodated between the standby position, retracted into the support assembly 6, and the active position, in which the camera unit 3 protrudes, at least in part, out of the through hole 7 of the support assembly 6. Furthermore, the cover element 8 belongs to the device 2, which is designed such that it can move between a closed setting, which closes the through hole 7 of the support assembly 6, and an open setting. Likewise, the movement mechanism 9 for moving the camera unit 3 and the cover element 8 also belong to the device 1. The movement mechanism 9 comprises the first pivot element 10, which is pivotably supported at its first longitudinal end 10a on the support assembly 6 such that it can pivot about the first rotational axle 15, and which is connected in an articulated manner to the first articulation axle 16 of the camera unit 3 at its second longitudinal end 10b, the second pivot element 11, which is pivotably supported on the support assembly 6 at its first longitudinal end 11a, such that it can pivot about the second rotational axle 17, and which is connected in an articulated manner to the second articulation axle 18 of the camera unit 3 at its second longitudinal end 11b, and the third pivot element 12, which is pivotably supported on the support assembly 6 at its first longitudinal end 12a, such that it can pivot about the first rotational axle 15, and is connected to the cover element 8 at its second longitudinal end 12b.

The invention described above is, as a matter of course, not limited to the embodiment described and depicted herein. It is clear that numerous obvious modifications can be made to the embodiment depicted in the drawings by the person skilled in the art, regarding the intended use, without abandoning the scope of the invention thereby. Everything contained in the description and/or depicted in the drawings belongs to the invention, including that which is obvious to the person skilled in the art that deviates from the concrete exemplary embodiments.

The invention claimed is:

1. A device comprising
   a camera unit with a lens for recording images of the exterior of a motor vehicle;
   a support assembly, which has a through hole, and in which the camera unit is moveably received, such that it can move between a retracted standby position in the support assembly and an active position, in which the camera unit protrudes, at least in part, out of the through hole of the support assembly;
   a cover element, which is designed such that it can move between a closed setting that closes the through hole of the support assembly and an open setting; and
   a movement mechanism for moving the camera unit and the cover element, wherein the movement mechanism comprises a first pivot element, which is pivotably supported on the support assembly at its first longitudinal end, such that it can pivot about a first rotational axle, and which is connected in an articulated manner to a first articulation axle of the camera unit at its second longitudinal end, a second pivot element, which is pivotably supported on the support assembly at its first longitudinal end, such that it can pivot about a second rotational axle, and which is connected in an articulated manner to a second articulation axle of the camera unit at its second longitudinal end, and a third pivot element, which is pivotably supported on the support assembly at its first longitudinal end, such that it can pivot about the first rotational axle, and which is connected to the cover element at its second longitudinal end.

2. The device according to claim 1, wherein the movement of the camera unit from the standby position into the active position is opposite to the movement of the cover element from the closed setting into the open setting.

3. The device according to claim 1, wherein the movement of the camera unit from the standby position into the active position occurs at the same time as the movement of the cover element from the closed setting into the open setting, and with this movement of the camera unit and the cover element, the respective pivotal movements of the first and third pivot elements have the same direction of rotation.

4. The device according to claim 1, wherein the second longitudinal end of the third pivot element is connected in an articulated manner to a first articulation axle of the cover element, and in that the movement mechanism has a fourth pivot element, which is pivotably supported on the support assembly at its first longitudinal end such that it can pivot about a third rotational axle, and which is connected in an articulated manner to a second articulation axle of the camera unit at its second longitudinal end.

5. The device according to claim 4, wherein the spacing between the first and second articulation axles of the cover element is greater than the spacing between the first and second articulation axles of the camera unit and/or than the spacing between the first and third rotational axles of the support assembly.

6. The device according to claim 4, wherein the rotational axles of the support assembly are disposed behind one another with respect to the camera unit, from the lens of the camera unit to the longitudinal end of the camera unit facing away from the lens.

7. The device according to claim 4, wherein, when the camera unit is disposed in the standby position, the third rotational axle is disposed in the vicinity of the lens of the camera unit, and the first rotational axle is disposed in the vicinity of the longitudinal end of the camera unit facing away from the lens, wherein the second rotational axle is disposed between the first and third rotational axles.

8. The device according to claim 4, wherein the first and second pivot elements of the camera unit pivot about the first and second rotational axles of the support assembly when it moves from the standby position into the active position, while the third and fourth pivot elements of the cover element pivot about the second and third rotational axles of the support assembly when it moves from the closed setting into the open setting.

9. The device according to claim 4, wherein the first rotational axle and/or the third rotational axle are/is designed to be connected to a drive.

10. The device according to claim 1, wherein the spacing between the first and second articulation axles of the camera unit is greater than the spacing between the first and second rotational axles of the support assembly.

11. The device according to claim 1, wherein the first articulation axle of the camera unit is disposed thereon on the longitudinal end of the camera unit facing away from the lens, and in that the second articulation axle of the camera unit is disposed thereon between the lens and the first articulation axle of the camera unit.

12. The device according to claim 1, wherein the first and second rotational axles of the support assembly are disposed closer to the through hole than the first and second articulation axles of the camera unit.

13. The device according to claim 1, wherein the first pivot element and the third pivot element form a collective monolithic component, and the first longitudinal end of the first pivot element is connected to the first longitudinal end of the third pivot element, wherein the first pivot element is designed such that it angled in relation to the third pivot element.

\* \* \* \* \*